Figure 1:
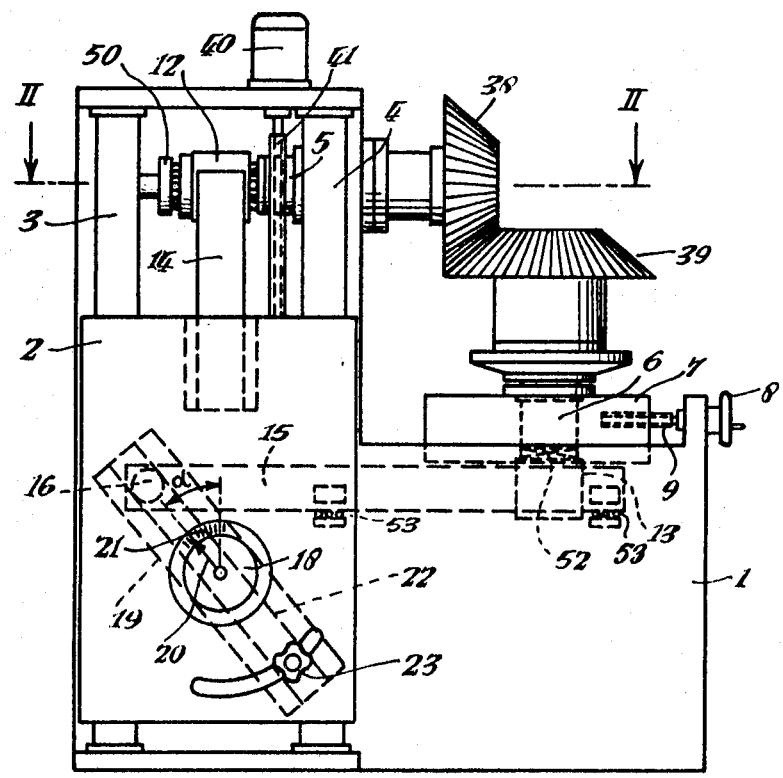

United States Patent

[11] 3,604,120

[72] Inventor Karl Müller
  Zurich, Switzerland
[21] Appl. No. 801,973
[22] Filed Feb. 25, 1969
[45] Patented Sept. 14, 1971
[73] Assignee Maag Gear Wheel & Machine Company, Limited
  Zurich, Switzerland
[32] Priority Mar. 15, 1968
[33] Germany
[31] P 16 73 861.7

[54] TOOTHED GEARWHEEL SINGLE FLANK TOTAL COMPOSITE ERROR-TESTING APPARATUS
4 Claims, 2 Drawing Figs.

[52] U.S. Cl. .................................................. 33/179.5 C
[51] Int. Cl. ...................................................... G01b 5/24
[50] Field of Search ............................................ 33/179.53

[56] References Cited
UNITED STATES PATENTS
2,687,576 8/1954 Mahr .......................... 33/179.5
3,031,765 5/1962 Müller ......................... 33/179.5

Primary Examiner—Leonard Forman
Assistant Examiner—Dennis A. Dearing
Attorneys—Howard J. Churchill, Robert S. Dunham, P. E. Henninger, Lester W. Clark, Thomas F. Moran, Gerald W. Griffin, R. Bradlee Boal, Christopher C. Dunham, Robert Scobey and Abraham Engel ABSTRACT: In apparatus for testing for single-flank total composite error in a bevel gearwheel transmission at a required center spacing and in which the gearwheels to be tested are coupled each to a respective cylindrical measuring disc, and two straight edges roll upon said measuring discs without sliding thereon, one of said straightedges acting upon indicating means, the measuring discs being constructed as base circle discs of constant diameter independently of the transmission ratio of the gearwheels to be tested, and the longitudinal motions of the two straightedges being matched to each other by way of a control bar which is angularly adjustable in accordance with the transmission ratio of the gearwheels, the control bar being mounted on a slide which carries the two straightedges, the other said straightedge having a body rectilinearly guided on said control bar, the axes of the two base circle discs are disposed perpendicularly to each other.

TOOTHED GEARWHEEL SINGLE FLANK TOTAL COMPOSITE ERROR-TESTING APPARATUS

This invention relates to apparatus for testing for single-flank total composite error in a gearwheel transmission at a required center spacing and in which the gearwheels to be tested are coupled each to a respective cylindrical measuring disc, and two straightedges roll upon said measuring discs without sliding thereon, one of said straightedges acting upon indicating means, the measuring discs being constructed as base circle discs of constant diameter independently of the transmission ratio of the gearwheels to be tested, and the longitudinal motions of the two straightedges being matched to each other by way of a control bar which is angularly adjustable in accordance with the transmission ratio of the gearwheels, the control bar being mounted on a slide which carries the two straightedges, the other said straightedge having a body rectilinearly guided on said control bar. Testing apparatus of the above kind is disclosed in German Pat. specification No. 1,095,528 (U.S. Pat. specification No. 3,031,765, and British Pat. specification No. 869,771).

An angle transmission having a constant transmission ratio is provided for converting the rotating motion of a test wheel in the known apparatus for testing bevel gear transmissions. Even if the bevel transmission comprises a friction transmission, the kinematic coupling in the test apparatus between the two bevel wheels is longer and therefore more critical than in the testing of spur gears. Lengthening of the kinematic coupling in the apparatus is, however, accompanied by an increase of the internal error proneness of the apparatus.

To eliminate this disadvantage the apparatus of the present invention is characterized in that, for the testing of bevel gearwheel transmissions, the axes of the two base circle discs are disposed perpendicularly to each other. In a preferred embodiment the axes of the two base circle discs are identical with the workpiece axes.

The indicating means may be disposed between a mandrel for one test wheel and the corresponding base circle disc and be adapted to indicate the angular difference between the two rotating elements.

Figure 2:
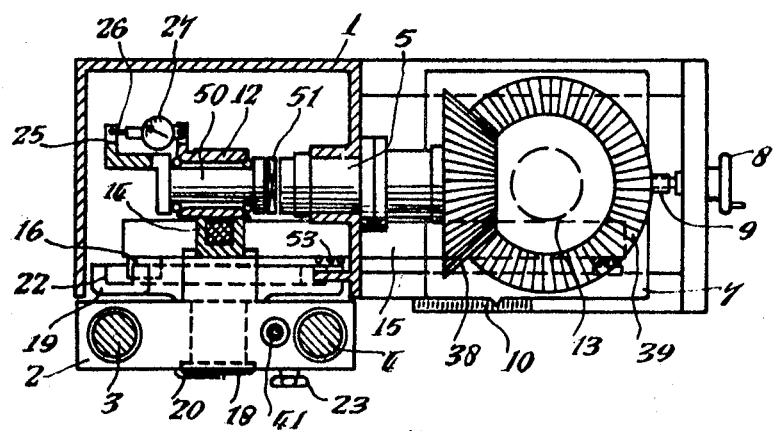

One embodiment of the invention is shown in diagrammatic form in the accompanying drawings, in which:

FIG. 1 is a side elevation; and
FIG. 2 is a plan view, partly in section on the line II—II of FIG. 1.

A vertically movable slide 2 is slidably disposed, by means of guideways 3 and 4, on the bed 1 of a single-flank total composite error-testing apparatus for bevel gears. A test wheel mandrel 5 for one bevel gear 38 of the transmission to be tested is horizontally supported in the bed 1. The second bevel gear 39 is vertically supported by means of a test wheel mandrel 6 in a slide 7, said slide being horizontally slidable by means of a handwheel 8 and a spindle 9 for the purpose of adjusting the center spacing of the two gearwheels 38, 39 on the bed 1. The center spacing is indicated on a scale 10.

A first base circle disc 12 is freely rotatably mounted coaxially on an extension 50 of the test wheel mandrel 5. The extension 50 is freely rotatable relative to the test wheel mandrel 5, but may also be coupled thereto by means of a clutch 51. Indicating means 27, having a sensing element 26 which engages in a recess 25 of the extension 50, are mounted on the base circle disc 12. The indicating means 27 are thus disposed between the test wheel mandrel and the associated base circle disc 12.

A second base circle disc 13 is coupled, by way of a clutch 52, to the test wheel mandrel 6. The base circle discs 12, 13 each have a constant diameter. Both base circle discs 12 and 13 are each engaged without slip with a rolling bar 14 and 15, respectively; the said freedom from slip is obtained by electromagnetic means. The rolling bar 14 associated with the base circle disc 12 is mounted rigidly on the slide 2 and moves vertically therewith. The rolling bar 15 associated with the base circle disc 13 is guided on balls 53 in the bed 1 to move horizontally and perpendicularly to the direction of movement of the slide 2.

A pin 16 is rotatably supported on the rolling bar 15, the said pin engaging and sliding within a straight longitudinal groove 22 of a control bar 19 which is angularly adjustable about a shaft 18 mounted in the slide 2. The position of the control bar is indicated as an angle $\alpha$ by means of a pointer 20 on a scale 21. The control bar 19 can be adjusted and fixed on the slide 2 by means of a handle 23.

The slide 2, and therefore the elements mounted thereon, are driven by a motor 40 by way of a screw spindle 41 which engages in a nut of the slide 2 to raise or lower the latter.

In order to test the bevel gears 38 and 39 they are mounted on the test wheel mandrels 5 and 6 and adjusted to the specified center distance. Center distance adjustment of the bevel gear 39 is effected by means of the handwheel 8 and spindle 9 and indicated on the scale 10, while for the bevel gear 38 it is adjusted by means of spacer collars or other appropriate devices mounted on the mandrel 6. The control bar 19 is then adjusted, by means of the handle 23, scale 21 and pointer 20, into that angular position $\alpha$ which corresponds to the test transmission. The formula of this angular adjustment is:

$$\tan \alpha = z_1/z_2$$

where:
$\alpha$ = setting angle of the control bar 19,
$z_1$ = number of teeth on the bevel gear 38,
$z_2$ = number of teeth on the bevel gear 39,
the diameters of the base circle discs 12 and 13 being assumed to be identical.

After locking the control bar 19 in its required angular position by means of the handle 23, the clutches 51 and 52 are closed, that is to say, the extension 50 is coupled to the test wheel mandrel 5 and the base circle disc 13 is coupled to the test wheel mandrel 6. The slide 2 is then traversed vertically upwards by means of the motor 40 and screw spindle 41 from the position shown in FIG. 1. This motion, in which the control bar 19 also participates, causes the pin 16 to move to the right within the longitudinal groove 22 and thus also causes the rolling bar 15 to move to the right. The rolling bar 15 drives the base circle disc 13 without slip and imparts rotary motion to the bevel gear 39. Accordingly, the bevel gear 38 will also rotate as well as the extension 50 by way of the clutch 51. The upward motion of the slide 2 also causes the rolling bar 14 to move upwardly, thus driving the base circle disc 12 without slip. If the gear tooth system of the test transmission is free from error the extension 50 will rotate coangularly with the base circle disc 12, and the indicating means 27 will not deflect. However, if there are errors in the test transmission flanks which mesh during this motion, such errors will be recorded by the indicating means 27.

The upper flanks of the test transmission will be tested in an analogous manner during the downward motion of the slide 2.

Owing to the limited length of the control bar 19 and the limited path of the slide 2, it is not always possible for the whole of a larger test wheel in a gear transmission to be tested in one pass. By disengaging the clutches 51 and 52 at the end of a first testing pass, returning the slide 2 into the starting position and reengaging the clutches 51 and 52, it is possible for the test to be continued until the larger test wheel has completed a full rotation.

What we claim is:

1. Apparatus for testing single-flank total composite error in a bevel gear pair disposed at a required mounting distance, including means for mounting first and second intermeshing bevel gears to be tested, first and second base circle discs of a given diameter independent of the transmission ratio of the bevel gear pair, the two base circle discs being mounted such that the axis of the first and second base circle disc is coaxial with the axis of the first and second bevel gear, respectively, the axes of the base circle discs thereby being perpendicular to each other, the first base circle disc being freely rotatable relative to the first bevel gear, the second base circle disc being connectable rigidly with the second bevel gear, first and second rolling bars disposed perpendicularly to each other and perpendicularly to the axes of the first and second base circle discs, respectively, the first and second rolling bar being slidable without slip on the first and second base circle disc, respectively, a slide being slidably mounted for movement perpendicular to the axis of said first bevel gear, said slide bearing the first rolling bar which is rigidly mounted on the slide so as to be movable therewith, the second rolling bar being rectilinearly movable relative to the slide, a control bar mounted on the slide to be angularly adjustable relative to and in the plane of the slide in accordance with the transmission ratio of the gear pair, the second rolling bar being movable rectilinearly by the control bar, means for driving the slide so as to cause movement of the two rolling bars, the two base circle discs and the two intermeshing bevel gears, and indicating means located between the first base circle disc and the mounting means for the first bevel gear to be responsive to error between rotating motion transmitted to the second bevel gear and the rotating motion produced in the first bevel gear by the intermeshing of the gear pair.

2. Apparatus according to claim 1, in which the means for mounting the bevel gear pair comprises two mandrels, and the said indicating means are disposed between the mandrel for the first bevel gear and the first base circle disc and are adapted to indicate the angular difference between the rotating motion of the first bevel gear and the first base circle disc.

3. Apparatus according to claim 1, in which the means for connecting rigidly the second base circle disc with the second bevel gear is a detachable clutch, and a further detachable clutch is disposed between the indicating means and the first bevel gear.

4. Apparatus for testing single-flank total composite error in a bevel gear pair disposed at a required mounting distance, including means for mounting first and second intermeshing bevel gears to be tested, first and second base circle discs of a given diameter independent of the transmission ratio of the bevel gear pair, the two base circle discs being mounted such that the axis of the first and second base circle disc is coaxial with the axis of the first and second bevel gear, respectively, the axes of the base circle discs thereby being perpendicular to each other, first and second rolling bars disposed perpendicularly to each other and perpendicularly to the axes of the first and second base circle discs, respectively, the first and second rolling bar being slidable without slip on the first and second base circle disc, respectively, a slide fast with the first rolling bar, said slide being slidably mounted for movement perpendicular to the axis of said first bevel gear a control bar mounted on the slide to be angularly adjustable relative to and in the plane of the slide in accordance with the transmission ratio of the gear pair, the second rolling bar being movable rectilinearly by the control bar, drive means for causing movement of the slide, the first rolling bar which is fast with the slide and the control bar mounted on the slide and thereby causing said rectilinear movement of the second rolling bar, whereby to rotate the two base circle discs, the first base circle disc being freely rotatable relative to the first bevel gear, the second base circle disc being freely rotatable relative to the second bevel gear and means being provided for directly coupling the second base circle disc with the second bevel gear to drive the second bevel gear and also drive the first bevel gear intermeshing with the second bevel gear, and indicating means located between the first base circle disc and the mounting means for the first bevel gear for comparing the rotating motion of the first base circle disc with the rotating motion of the first bevel gear.